(12) United States Patent
Hansen

(10) Patent No.: US 8,313,649 B2
(45) Date of Patent: Nov. 20, 2012

(54) METHOD OF STARTING UP A FILTRATION PLANT AND A FILTRATION PLANT DESIGNED TO BE ABLE TO START UP CORRESPONDINGLY

(75) Inventor: Svend Emil Himmelstrup Hansen, Hinnerup (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 1061 days.

(21) Appl. No.: 12/158,891

(22) PCT Filed: Dec. 8, 2006

(86) PCT No.: PCT/DK2006/000701
§ 371 (c)(1),
(2), (4) Date: Sep. 16, 2008

(87) PCT Pub. No.: WO2007/071244
PCT Pub. Date: Jun. 28, 2007

(65) Prior Publication Data
US 2009/0218284 A1    Sep. 3, 2009

(30) Foreign Application Priority Data
Dec. 23, 2005    (DK) .................................. 2005 01835

(51) Int. Cl.
*B01D 29/60*    (2006.01)
*B01D 29/66*    (2006.01)
*B01D 35/04*    (2006.01)

(52) U.S. Cl. .......... 210/650; 210/791; 210/806; 210/97; 210/106; 210/295; 210/321.69; 210/424; 210/96.2; 210/254

(58) Field of Classification Search ................. 210/254, 210/418, 248, 205, 194, 195.1, 195.2, 777, 210/641, 644, 649–653, 790, 805, 806, 167.31, 210/193, 96.1, 96.2, 99, 100, 104, 105, 106, 210/109, 110, 134, 139, 791, 97, 295, 321.69, 210/424
See application file for complete search history.

(56) References Cited

U.S. PATENT DOCUMENTS
4,708,790 A * 11/1987 Bray ................................ 210/87
(Continued)

FOREIGN PATENT DOCUMENTS
JP    09206061    12/1997
(Continued)

OTHER PUBLICATIONS
McDonald et al., Reduce Reverse Osmosis Membrane Fouling with Good CIP Procedures, Apr. 2004, Ultrapure Water, vol. 21, No. 3, pp. 46-52.*
(Continued)

*Primary Examiner* — Tony G Soohoo
*Assistant Examiner* — David C Mellon
(74) *Attorney, Agent, or Firm* — Finnegan, Henderson, Farabow, Garrett & Dunner, LLP

(57) ABSTRACT

A method of starting up a filtration plant for the filtration of a process liquid, after cleaning of the filtration plant, and a filtration plant which is arranged to be able to started up in accordance with this method.
A secondary liquid supply unit connected to the post-treatment equipment during the starting up of the plant provides a flow of e.g. sterilized water to the post-treatment equipment, so that this can be held in a condition in which it is ready for operation. Thereafter, the process liquid is led to the filtration equipment, and the flow of liquid from the secondary liquid supply unit to the post-treatment equipment is shut off when a flow of filtered process liquid is obtained, and which thereafter replaces the liquid from the secondary liquid supply unit.

9 Claims, 1 Drawing Sheet

U.S. PATENT DOCUMENTS

| | | | | |
|---|---|---|---|---|
| 4,869,830 A | * | 9/1989 | Konak et al. | 210/708 |
| 5,183,572 A | * | 2/1993 | Benn | 210/650 |
| 5,356,651 A | | 10/1994 | Degen et al. | |
| 5,679,780 A | | 10/1997 | Jensen et al. | |
| 6,113,791 A | | 9/2000 | Hartmann | |
| 6,349,835 B1 | * | 2/2002 | Saux et al. | 210/427 |
| 6,375,014 B1 | | 4/2002 | Garcera et al. | |
| 2004/0116679 A1 | | 6/2004 | Konigsfeldt et al. | |
| 2007/0267353 A1 | * | 11/2007 | Mak et al. | 210/741 |
| 2011/0049048 A1 | * | 3/2011 | Benner et al. | 210/636 |

FOREIGN PATENT DOCUMENTS

| | | |
|---|---|---|
| RU | 2077510 | 4/1997 |
| RU | 2188700 | 9/2002 |
| WO | 02055182 | 7/2002 |
| WO | WO 2005049174 A1 * | 6/2005 |

OTHER PUBLICATIONS

International Search Report re PCT/DK06/000701, Apr. 19, 2007.

* cited by examiner

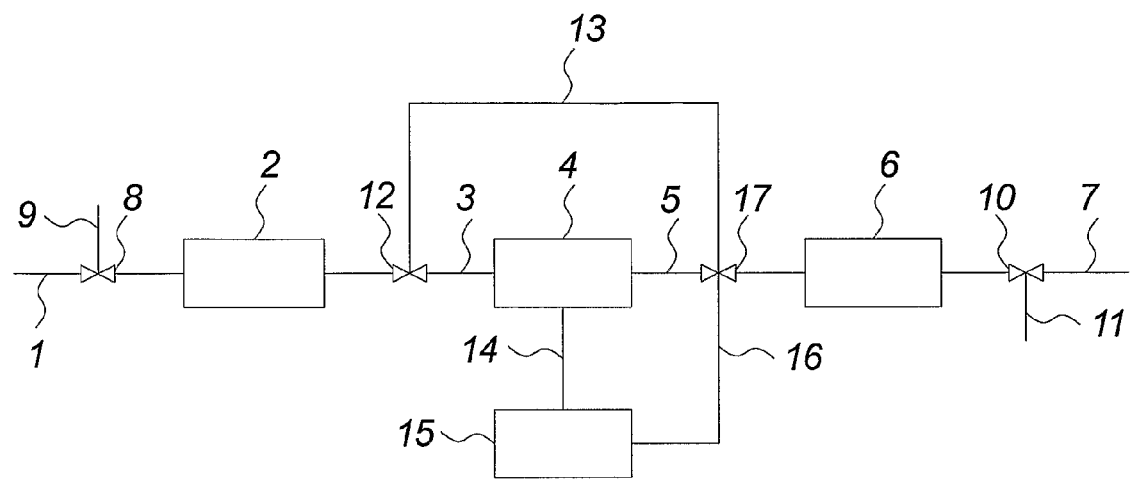

METHOD OF STARTING UP A FILTRATION PLANT AND A FILTRATION PLANT DESIGNED TO BE ABLE TO START UP CORRESPONDINGLY

TECHNICAL FIELD OF THE INVENTION

The present invention relates to a method of starting up a filtration plant for the handling of a process liquid within the foodstuffs industry, the pharmaceutical industry, the chemical industry and other relevant areas after cleaning of the filtration plant, and a filtration plant which is arranged to be able to be started up in accordance with this method.

BRIEF DISCUSSION OF RELATED ART

The handling of process liquids by filtration for use either of the part of the liquid which passes the filter, the permeate, or the part of the liquid which is retained by the filter, the retentate, is well known from a number of industries. Within the foodstuffs industry, use is made of such processing and filtration plants e.g. in the production of milk products and beer.

Especially known are filtration plants for the handling of milk, where bacteria and spore are retained from the process liquid, the milk, with the object of extending the keeping qualities of the finished product.

However, fouling of the filter membranes cannot be avoided, and a regular cleaning of the filtration plant is necessary, with consequent halting of operations. In the starting up after the cleaning of the filtration plant, which in addition to the filter itself normally comprises other equipment for pre-handling and/or post-treatment of the process liquid, for many plants there must be a constant flow of liquid through the plant, e.g. pasteurising plants and other through-flow plants, in order to be in the correct state of operation. Therefore, the filtration plant is flushed through with a neutral liquid, e.g. sterilised water, before the process liquid is led into the plant, and a period of time elapses before that liquid which comes out of the plant is no longer a mixture of the treated process liquid and the neutral liquid, which results not only in a loss of process liquid, but also a loss of operating time for the plant, where both of these losses can be quite considerable.

BRIEF SUMMARY OF THE INVENTION

Therefore, the invention provides a method for the starting up of a filtration plant whereby these disadvantages are reduced, and to provide a filtration plant which is arranged to be able to be started up in accordance with this method.

In the filtration process, use is often made of so-called cross-flow filtration, where the process liquid on the retentate side of the filter is re-circulated at high rate of flow through channels parallel with the surface of the membrane, whereby the flow rate and turbulence counteracts a blocking of the surface of the membrane by larger particles from the process liquid, these being held suspended in the retained part of the process liquid, the retentate.

For the micro-filtration of milk, use is made of membranes with a pore size in the range of 0.1-10 μm (or 0.05-10 μm), hence the name micro. Sine the membrane allows passage only of particles of a certain physical size, its function is to separate certain suspended particles from the rest of the process liquid.

With re-circulation on the retentate side there occurs a quite excessive mixing-up between the retentate and the newly-introduced process liquid, and the above-mentioned disadvantages in the starting-up of the filtration plant with cross-flow filtration equipment are considerable, and thus the invention further provides a method for use with a filtration plant with cross-flow filtration equipment.

BRIEF SUMMARY OF THE INVENTION

The method according to the present invention results in a reduction of the above-mentioned disadvantages by providing the filtration plant with a secondary liquid supply unit, e.g. a liquid container which is connected to the post-treatment equipment arranged down-stream from the filtration plant, and during the starting up of the plant by providing a flow of a neutral liquid, preferably sterilised water, from the secondary liquid supply unit to the post-treatment equipment, so that it can be held in the operational state. Thereafter, the process liquid is led to the filtration equipment, and the flow of liquid from the secondary liquid supply unit to the post-treatment equipment is cut off when a flow of filtered process liquid is obtained, and which thereafter replaces the liquid from the secondary liquid supply unit.

It is hereby achieved that it is no longer necessary to have a continuous flow of liquid through the filtration equipment during the filling of said equipment in order to be able to maintain operating conditions in the post-treatment equipment, and the mixing-up between the neutral liquid and the process liquid can be reduced to a fraction, with consequently shorter time for which the plant is out of operation and less wastage of process liquid.

The invention hereby provides a method for the starting up of filtration plants for the filtration of a process liquid, especially a liquid for foodstuffs production, such as milk, where the plant comprises supply equipment for the process liquid, filtration equipment and post-treatment equipment, especially through-flow equipment such as a pasteurising equipment, where the filtration equipment is arranged for the handling of a flow of process liquid from the supply equipment, and the feeding of a flow of filtered process liquid to the post-handing equipment, a secondary liquid supply unit, which is connected to the post-treatment equipment, where the method comprises the following steps:

the supplying of a flow of liquid, preferably sterilised water, from the secondary liquid supply unit to the post-treatment equipment, the supplying of a flow of process liquid to the filtration plant, and shutting off the flow of liquid from the secondary liquid supply unit to the post-treatment equipment when a flow of filtered process liquid has been achieved which fulfils predefined criteria, and instead leading the flow of filtered process liquid to the post-treatment equipment.

The method according to the invention is especially advantageous when the filtration plant comprises equipment for cross-flow filtration, especially micro-filtration, in that the re-circulation of the liquid on the retentate side, which would otherwise result in an excessive mixing-up of the neutral liquid and the process liquid, is hereby avoided.

In a special embodiment, the filtration plant is suitable for micro-filtration and has a pore size which lies between 0.05 micrometers and 10 micrometers, preferably between 0.1 micrometers and 5 micrometers, and most preferably between 1 micrometer and 2 micrometers.

It is also a preferred embodiment that the equipment for cross-flow filtration is arranged for and has a uniform trans-membrane flux substantially across the whole of the membrane.

The fouling of the membrane is the primary factor in reducing the applicability of micro-filtration. The degree of fouling determines the membrane's cleaning frequency, lifetime and the necessary membrane area, which has a great effect on costs, design and operation of filtration processes. An important factor which controls how quickly the fouling takes place is the degree of uniformity in the longitudinal direction of the channels, i.e. in the retentate's flow direction of the trans-membrane flux, i.e. the permeate flow per unit area of the membrane. Since the pressure of the process liquid in the channels decreases in the direction from inlet to outlet of retentate, the result is a corresponding decrease in the trans-membrane pressure. With a uniform membrane permeation and a uniform pressure on the permeate side of the membrane, the membrane near the inlet end of a channel in the filter will quickly be blocked, the reason being that the retentate pressure here is high and the trans-membrane flux is herewith also high, and the pressure will force the particles in the retentate into the membrane and block this, consequently with a short period of time between the necessary cleanings of the filtration plant, which is why it is preferred to use membranes as described e.g. in U.S. Pat. No. 6,375,014, where the outer sides of the membrane modules are provided with a macro-porous layer which has a decreasing thickness in the direction from inlet to outlet of the retentate, where the thickness is adapted in such a manner that the overall permeability results in a uniform flux through the membrane and counteracts the effect of the flow-induced drop in pressure through the channels.

U.S. Pat. No. 5,679,780 describes another method of counteracting differences in the trans-membrane flux by re-circulating the permeate along the membrane at such a speed that a corresponding drop in pressure is achieved along the membrane's outer side as along its inner side within the channels, whereby the trans-membrane pressure difference is more uniform in the longitudinal direction of the filtration channels, i.e. in the retentate's primary direction of flow.

With a membrane with a substantially uniform trans-membrane flux, a re-circulation of the permeate is not necessary during start-up, whereby a further mixing-up can be limited. Moreover, it is possible that the permeate side of the filtration plant is substantially drained of liquid before the plant is supplied with a flow of process liquid during the starting-up of the plant, in that there is no recirculation of liquid required on the permeate side in order to achieve the uniform trans-membrane flux for limiting the fouling of the membrane.

It is a further advantage that the retentate side of the filtration plant is substantially drained of liquid before the plant is supplied with a flow of process liquid during start-up, and/or that the permeate side of the filtration plant is substantially drained of liquid before the plant is supplied with a flow of process liquid during start-up. It is also advantageous that the liquid which is drained from the filtration plant is led to a container which forms part of the secondary liquid supply unit, whereby the liquid can be re-used during the start-up of the filtration plant.

Finally, it is an advantageous embodiment that before start-up the filtration plant is continuously flushed through with a flow of a liquid, preferably sterilised water, which flows from the filtration equipment to the post-treatment equipment, said method comprising the step of leading said flow of liquid through a shunt connection around the filtration equipment, so that this flow of liquid through the post-treatment equipment is maintained while the filtration equipment is drained.

Finally, the invention relates to a filtration plant for the filtration of a process liquid, where the plant comprises supply equipment for the process liquid, filtration equipment and post-treatment equipment, where the filtration equipment is arranged for the handling of a flow of process liquid from the supply equipment, and leading a flow of filtered process liquid to the post-treatment equipment, a secondary liquid supply unit, which is connected to the post-treatment equipment, where the filtration plant also comprises a control arrangement which is arranged to control the start-up of the filtration plant in accordance with the above-mentioned method.

BRIEF DESCRIPTION OF THE DRAWING

In the following, the invention is described with reference to the drawing, where
FIG. 1 shows a schematic illustration of a plant for the handling of process liquid.

DETAILED DESCRIPTION OF THE INVENTION

FIG. 1 shows a plant which comprises filtration equipment for the filtration of a process liquid, with special arrangements for cleaning and subsequent start-up of the plant in accordance with a preferred embodiment of the invention. The plant comprises an inlet pipe 1 for process liquid and an inlet pipe 9 for sterilised water, where both inlet pipes 1, 9 lead via a valve 8 to a pre-handling unit 2, which via a valve 12 and a pipe piece 3 is in turn connected to the inlet side of a filtration unit 4, the outlet side of which is connected via a pipe piece 5 and a valve 17 to the inlet side of a post-treatment unit 6. The outlet side of this is connected via a valve 10 to an outlet pipe 7 for the post-treated process liquid, and a second outlet pipe 11 for the draining of other liquid from the plant. The plant also comprises a shunt 13 which connects the valves 12 and 17, a secondary liquid supply unit in the form of a container 15 for sterilised water, the inlet side of which is connected to the filtration unit 4's liquid drain 14, and the outlet side is connected to the valve 17.

During normal operation, the plant is supplied with a process liquid, preferably a foodstuff in liquid form, which e.g. can be milk or beer, which is fed into the plant via pipe piece 1. Via the valve 8, the process liquid is fed to the pre-processing equipment 2 which, for example, can be equipment for homogenising the process liquid, and further via valve 12 and pipe piece 3 to the filtration unit 4, which can preferably be equipment for cross-flow filtration, such as micro-filtration for removal of e.g. bacteria and spores. A part of the filtered process liquid, preferably the permeate from the filtration process, alternatively the retentate, is fed from the filtration unit 4 via pipe 5 and valve 17 to the post-treatment equipment 6, which e.g. can be equipment for pasteurising, and finally the post-treated process liquid flows via valve 10 further out of the plant through the pipe 7, e.g. for subsequent packaging or processing.

The pre-processing equipment 2, the filtration unit 4 and the post-treatment equipment 6 are preferably of the through-flow type, i.e. that the process liquid which flows through the equipment 2, 4, 6 is processed continuously as opposed to processing in batches, whereby a continuous flow of process liquid through the plant can be achieved.

With ordinary operation, the plant must be cleaned at regular intervals, typically after 6-14 hours of operation with the process liquid, especially for reasons of deposits in the filtration unit 4. The cleaning can be effected in several different ways, and is normally concluded by the plant being flushed through with sterilised water, which is fed in through the inlet pipe 9 and follows the process path for the process liquid, i.e. through the pre-treatment equipment 2 over the filtration unit 4 to the post-treatment equipment 6.

Until the plant switches over to ordinary operation with treatment of the process liquid, the flushing-through with sterilised water is continued so that the through-flow equipment, e.g. pasteurising arrangements in the after-treatment equipment 6, is operational with regard to liquid flow, pressure, temperature etc., and can receive process liquid for treatment. It is important for these through-flow equipments that there is a continuous flow of liquid through them, in that a discontinuation of the flow will result in them not being immediately ready for operation, but require a start-up sequence of shorter or longer duration.

The switching over to treatment of process liquid is started by leading sterilised water around the filtration unit 4 and instead through the shunt 13 by changing over the valves 12 and 17 by means of a control arrangement (not shown), which controls the operation of the plant, so that the liquid from the pre-treatment equipment 2 is led through the shunt 13 to the post-treatment equipment 6. Hereafter, the sterilised water is drained from the filtration unit to the container 15, at least from the retentate side of the filter. Depending on the type of filtration unit 4, water can also be drained from the permeate side, especially if use is made of the preferred type of cross-flow filters, where the trans-membrane pressure is substantially constant over the longitudinal direction of the filter in the direction from inlet to outlet of the retentate, without this requiring a liquid flow on the permeate side of the filter. By continuing the flow of the sterilised water through the shunt 13, the flow is maintained unchanged through the post-treatment equipment 6, which hereby remains in operational condition and is ready to receive and treat filtered process liquid as soon as the filtration unit 4 is in operation.

By changing over the valve 8 at the inlet, process liquid can thereafter be led into the plant from inlet pipe 1 instead of sterilised water from inlet pipe 9. Since the pre-treatment equipment 2 is of the through-flow type, the process liquid forces the sterilised water from the pre-treatment equipment 2 without a significant mixing of the two liquids taking place. With the process liquid reaching through the pre-treatment equipment 2 and forward to the valve 12, which is monitored by a series of sensors in the plant which are in connection with the plant's control arrangement, the valve 12 is changed over so that the flow of liquid from the pre-treatment equipment 2 is led to the filtration unit 4 instead of through the shunt 13. In order to keep the post-treatment equipment 6 operational, the valve 17 changes over so that the sterilised water is led from the container 13 through the pipe piece 16 to the post-treatment equipment 6, and via the valve 10 the sterilised water finally flows out of the plant through the outlet pipe 11 for draining, e.g. for returning and re-use of the water.

When the filtration unit 4 is ready for operation and can deliver a suitable flow of filtered process liquid to the post-treatment equipment 6, the valve 17 changes over so that the filtered process liquid is led from the filtration unit 4 through the pipe 5 to the post-treatment equipment 6, and via valve 10 out of the plant through the outlet piece 11 for draining. This mixture of sterilised water and process liquid is led either to a waste water treatment plant or to reprocessing equipment, so that at least a part of the process liquid can be reclaimed and used. It is not until the plant's sensors, which are connected to the control arrangement, indicate that the fully-treated process liquid is of a suitable quality, that the valve 10 changes over so that the fully-treated process liquid is led through the outlet pipe 7 for e.g. subsequent packaging or processing.

The invention claimed is:

1. Method of starting a filtration plant for filtration of a process liquid, where the plant comprises supply equipment for the process liquid, filtration equipment and post-treatment equipment, where the filtration equipment is arranged for treatment of a flow of process liquid from the supply equipment and delivers a flow of filtered process liquid to the post-treatment equipment, and a secondary liquid supply unit which is connected to the post-treatment equipment, the method comprising:
   supplying of a flow of liquid from the secondary liquid supply unit to the post-treatment equipment,
   substantially draining a retentate side of the filtration equipment of liquid,
   supplying a flow of process liquid to the filtration equipment, and
   shutting-off the flow of liquid from the secondary liquid supply unit to the post-treatment equipment when a flow of filtered process liquid which fulfils predefined criteria, thereby indicating that the filtered process liquid is ready for post-treatment, has been achieved, and instead leading the flow of filtered process liquid to the post-treatment equipment.

2. Method according to claim 1, where the filtration equipment comprises equipment for cross-flow filtration.

3. Method according to claim 1, where the filtration equipment comprises equipment for micro-filtration.

4. Method according to claim 3, where the equipment for micro-filtration has a pore size which lies between 0.05 micrometers and 10 micrometers.

5. Method according to claim 2, where cross-flow filtration takes place across a membrane along which the process liquid flows on a retentate side, wherein there is substantially uniform trans-membrane flux substantially across the whole membrane.

6. Method according to claim 1, where a permeate side of the filtration equipment is substantially drained of liquid before the filtration equipment is supplied with a flow of process liquid during the starting up of the plant.

7. Method according to claim 1, where the liquid which is drained from the filtration equipment is led to a container which forms part of the secondary liquid supply unit.

8. Method according to claim 1, where before the starting up of the filtration plant the filtration equipment is continuously flushed through by a flow of a liquid which flows from the filtration equipment to the post-treatment equipment, said method comprising the step of leading said flow of liquid through a shunt connection around the filtration equipment, so that this flow of liquid through the post-treatment equipment is maintained while the filtration equipment is drained.

9. Filtration plant for the filtration of a process liquid, comprising:
   supply equipment for the process liquid,
   filtration equipment and
   post-treatment equipment, where the filtration equipment is arranged for treating of a flow of process liquid from the supply equipment and for leading a flow of filtered process liquid to the post-treatment equipment,
   a secondary liquid supply unit which is connected to the post-treatment equipment, and
   a control arrangement, which is configured for controlling a starting up of the filtration plant in accordance with the method of claim 1.

* * * * *